US012005024B2

(12) United States Patent
Colon et al.

(10) Patent No.: US 12,005,024 B2
(45) Date of Patent: Jun. 11, 2024

(54) WALKER WITH A FOLDABLE FOOT REST OR COLLAPSIBLE STEP

(71) Applicant: C & R Health Care Innovations LLC, Ocala, FL (US)

(72) Inventors: Pedro Colon, Ocala, FL (US); Aurelio Reyes, Mount Dora, FL (US)

( * ) Notice: Subject to any disclaimer, the term of this patent is extended or adjusted under 35 U.S.C. 154(b) by 202 days.

(21) Appl. No.: 17/742,058

(22) Filed: May 11, 2022

(65) Prior Publication Data

US 2022/0331190 A1 Oct. 20, 2022

Related U.S. Application Data

(63) Continuation-in-part of application No. 17/346,001, filed on Jun. 11, 2021.

(60) Provisional application No. 63/037,638, filed on Jun. 11, 2020.

(51) Int. Cl.
*A61H 3/00* (2006.01)
*A47C 12/00* (2006.01)

(52) U.S. Cl.
CPC ............... *A61H 3/00* (2013.01); *A47C 12/00* (2013.01); *A61H 2201/0157* (2013.01); *A61H 2201/0161* (2013.01); *A61H 2201/0173* (2013.01); *A61H 2201/0192* (2013.01); *A61H 2201/1253* (2013.01); *A61H 2201/1635* (2013.01); *A61H 2201/1642* (2013.01); *A61H 2201/1676* (2013.01)

(58) Field of Classification Search
CPC ...... A61H 2201/164; A61H 2201/1642; A61H 2201/1676; A61H 2003/005; A47C 16/02; A47C 12/00
USPC ............................................... 135/66, 67, 74
See application file for complete search history.

(56) References Cited

U.S. PATENT DOCUMENTS

| | | | | |
|---|---|---|---|---|
| 4,722,356 A * | 2/1988 | Rehder | A61H 3/00 | 297/423.37 |
| 7,871,088 B2 * | 1/2011 | Silva | A61G 5/10 | 280/47.35 |
| 2008/0029139 A1 * | 2/2008 | Pijanowski | A61H 3/0244 | 135/67 |
| 2010/0258152 A1 * | 10/2010 | Lin | A61H 3/00 | 135/69 |
| 2014/0190536 A1 * | 7/2014 | Friedman | G08C 19/00 | 340/4.1 |
| 2017/0202727 A1 * | 7/2017 | Wegener | A61H 3/00 | |
| 2018/0070732 A1 * | 3/2018 | Pillay | A61G 7/1013 | |
| 2021/0085086 A1 * | 3/2021 | Dokhanian | A47C 4/045 | |
| 2021/0386612 A1 * | 12/2021 | Colon | A61H 3/00 | |

* cited by examiner

*Primary Examiner* — Robert Canfield
(74) *Attorney, Agent, or Firm* — Eugenio J. Torres-Oyola; Victor M. Rodriguez-Reyes; Rafael Rodriguez-Muriel

(57) ABSTRACT

A walker that includes a handle, first frame having first and second legs, a second frame having first and second legs, one or more support bars, and a foldable or stowable foot rest, in which the folding action of the foot rest is actuated via the handle.

18 Claims, 13 Drawing Sheets

WALKER WITH A FOLDABLE FOOT REST OR COLLAPSIBLE STEP

RELATED APPLICATIONS

This application is a continuation-in-part of, and claims priority from, U.S. patent application Ser. No. 17/346,001, filed on Jun. 11, 2021, the contents of which are fully incorporated by reference.

FIELD OF THE DISCLOSURE

This disclosure relates to a walker step with a foldable foot rest or collapsible step.

BACKGROUND OF THE DISCLOSURE

Many areas of a house, such as bathrooms and other small rooms, do not have space that is adequate for allowing individuals (especially those with physical disabilities) to move or transfer from one point to another without difficulty, discouraging the individual from using assistive equipment or causing the individual to hold onto unsuitable surfaces, which can cause excessive forces or pressure to muscles and/or joints. Failure to use proper equipment or not performing good movement mechanics could cause musculoskeletal discomfort or injury, or joint or nervous system injuries. Therefore, people should use assistive equipment to avoid the risk of falls.

Falls can occur at any time and to anyone, but over the years the risk is greater. Health complications from falls can range from just simple injuries to life-threatening injuries. In the United States, these accidents constitute the seventh leading cause of death in elderly people, and it is estimated that 50% of deaths are related to falls. Falls are the cause of more than 8 million emergency room (ER) visits each year, and the numbers outnumber any other type of injury or illness that requires a visit to a hospital emergency room. Half of accidental fall deaths occur in the home.

The Centers for Disease Control and Prevention (CDC) reports that 1 in 3 adults over the age of 65 suffer falls, leading from moderate to severe injuries. Consequently, the most common injuries suffered are hip fractures and head trauma, which increases the risk of death. For older adults, falls are the leading cause of fatal and non-fatal injuries. The CDC reports that during a typical year, 2.4 million fatal falls require emergency room treatment, and of these, more than 722,000 patients were admitted for treatment at the facility. To prevent falls, much remains to be done. Education, counseling and the use of assistance teams are necessary tools to reduce these statistics.

With proper equipment or new assistive equipment, the probability of falls is dramatically reduced. Walkers are a helpful tool in avoiding or reducing falls. However, walkers alone may not be sufficient to help individuals with physical disabilities to reach certain places. Accordingly, it would be desirable to have a walker that provides an ideal elevation so that the individual using the walker can more easily access areas that are hard to reach with a standard walker, such as high off the ground beds, chairs, or cars.

As discussed in more detail below, the invention relates a foldable or stowable step that attaches to the walker to provide better elevation of the lower extremities, assisting an individual with physical disabilities to reach hard to reach places.

SUMMARY OF THE DISCLOSURE

The disclosure relates to a walker with a foldable foot rest comprising a first frame; a second frame; a handle having a first end and a second end; wherein the first frame includes a first leg and a second leg; wherein the second frame includes a first leg and a second leg; one or more horizontal support bars connecting the first leg of the first frame to the first leg of the second frame; wherein the horizontal support bar, in turn, includes a first connector and a second connector; wherein the first connector is adapted to hold in place a first vertical support bar having a top end and a bottom end, and the second connector is adapted to hold in place a second vertical support bar having a top end and a bottom end; wherein the top end of the first vertical support bar is configured to receive the first end of the handle, and the top end of the second vertical support bar is configured to receive the second end of the handle; wherein the bottom end of each vertical support bar is pivotally connected, via one or more pivot joints, to a foldable foot rest; a first top bar connecting an upper end of the first leg of the first frame with an upper end of the second leg of the first frame; a second top bar connecting an upper end of the second leg of the second frame with an upper end of the second leg of the second frame; and wherein the folding action of the foot rest is actuated via the handle.

DETAILED DESCRIPTION OF THE DISCLOSURE

As shown in FIGS. 1-8, the subject disclosure relates to a walker A comprising a first frame 1, a second frame 2, wherein the first frame includes a first leg 12*a* and a second leg 12*b*; and the second frame 2 includes a first leg 13*a* and a second leg 13*b*. Moreover, the walker A comprises one or more support bars SB1, SB2 connecting the first leg 12*a* of the first frame 1 to the first leg 13*a* of the second frame 2. It should be noted that the first end of the support bars SB1, SB2 can be welded or fastened to the first leg 12*a* of the first frame and that the second end of the support bars SB1, SB2 can also welded or fastened to the first leg 13*a* of the second frame. Lastly, the walker A comprises a foldable or stowable foot rest or step FR pivotally connected to either of the frames 1, 2 via the one or more pivot joints PV1, PV2. Particularly, the foot rest FR is pivotally connected to a rod R having a first end connected, fastened, or welded to the first leg 12*a* of the first frame 1; and a second end connected, fastened or welded to the second leg 12*b* of the first frame 1. Accordingly, the foot rest FR can rotate at the juncture in which they are pivotally connected and achieve a horizontal position if the foot rest FR is lowered; or a vertical position of the foot rest FR is raised. Alternatively, the first end of the rod R can be connected, welded, or fastened to the first leg 13*a* and the other end can be connected, welded, or fastened to the second leg 13*b* of the second frame 2. The material of the walker A, including the foot rest FR, can be selected from any strong, durable material such a plastic, metal, or any other similar material. Moreover, while the foot rest should preferably have a rectangular shape, it can have any shape capable of serving as a foot rest.

The first frame 1 may optionally include one or more bars B1, B2 connecting each first frame leg 12*a*, 12*b*; and the second frame 2 may optionally include one or more bars B3, B4 connecting each second frame leg 13*a*, 13*b*, in order to provide more stability to the first and second frames 1, 2. Moreover, as shown in FIGS. 1-8, the first frame 1 includes a first top bar TB1 connecting an upper end or portion of the first leg 12*a* of first frame with an upper end or portion of the second leg 12*b* of the first frame. Similarly, the second frame 2 includes a second top bar TB2 connecting an upper end or portion of the first leg 13*a* of the second frame with an upper end or portion of the second leg 13*b* of the second frame. The top bars TB1, TB2 allow a user to grab or hold on to the walker A while using the walker. It should be noted that the first leg 12*a* and second leg 12*b* of the first frame 1; as well as the first leg 13*a* and second leg 13*b* of the second frame 2, may extend obliquely and away from the center of the corresponding top bar. This configuration provides additional stability to the walker A, as shown in FIGS. 1, 2, 4 and 6.

Figure 1:
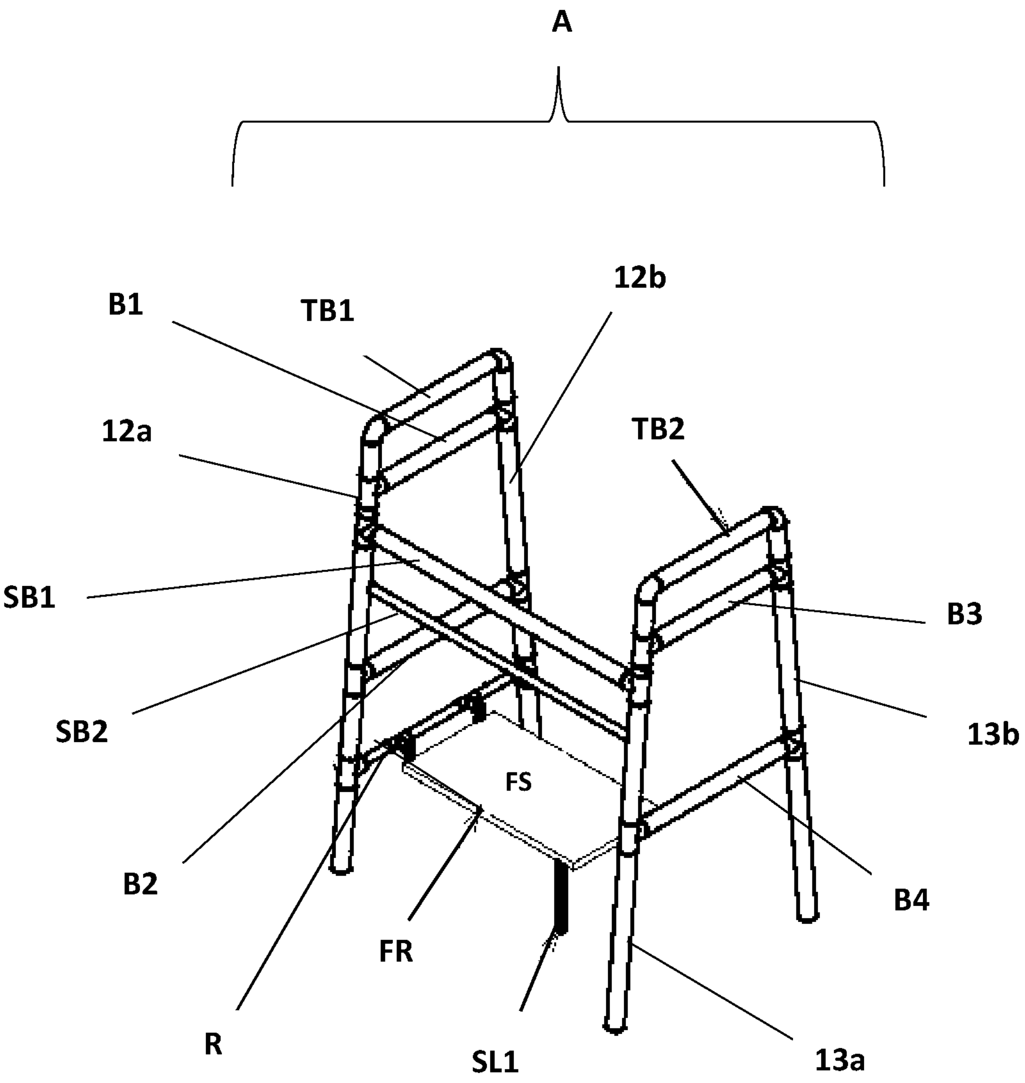
FIG. 1 is a perspective view of a walker step with the step in its lowered configuration.
Figure 2:
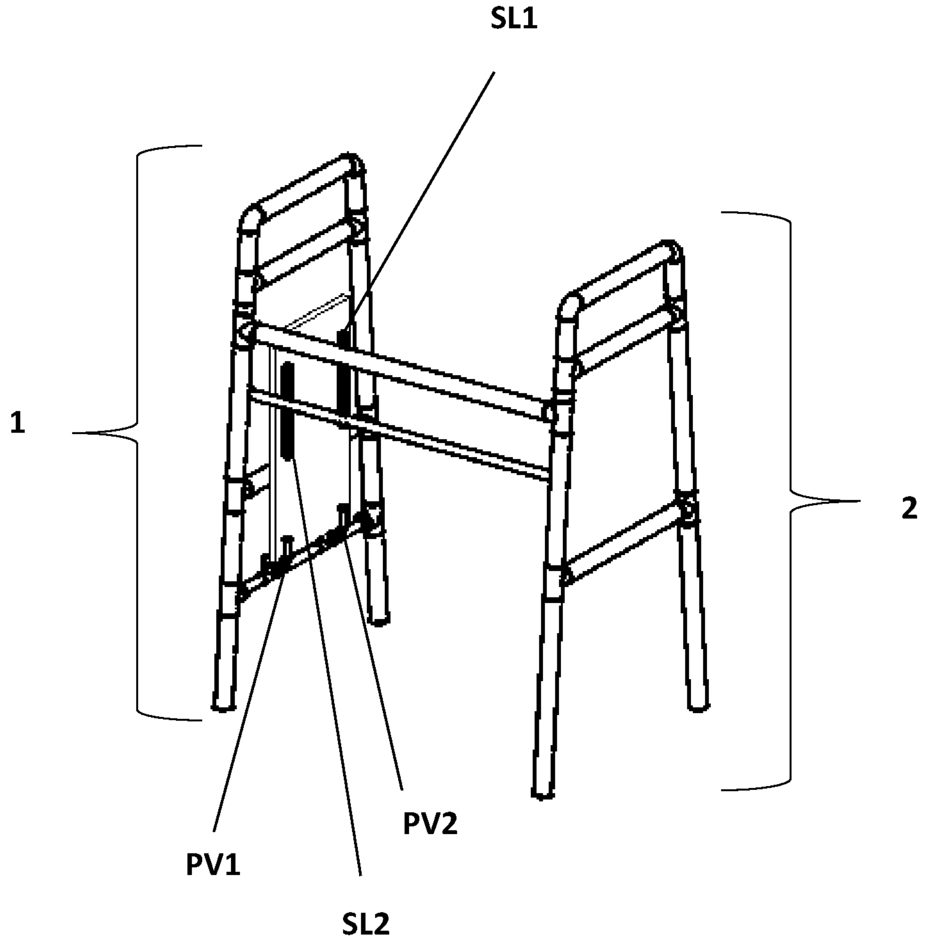
FIG. 2 is a perspective view of the walker step with the step in its raised configuration.

As shown in FIGS. 1 and 2, the foot rest FR comprises a flat surface FS having a top portion (i.e., the portion that receives the user's foot) and a bottom portion (i.e., the portion facing the floor); and one or more retractable foot rest support legs SL1, SL2 connected to or attached to the bottom portion of the flat surface FS via a hinge or similar structure. When the foot rest FR is lowered, the foot rest support legs SL1, SL2 are also lowered in response to gravity. Accordingly, when the foot rest FR is in a horizontal position or lowered configuration (i.e., with the bottom portion of the flat surface facing the floor), the support legs SL1, SL2 appear to be perpendicularly connected to the bottom of the flat surface FS. In other words, the one or more retractable foot rest support legs achieve a perpendicular position, with relation to the bottom portion of the flat surface, in response to gravity. Conversely, when the foot rest FR is in a vertical position or raised configuration (i.e., with the top portion of the flat surface facing the bars of the frame), the support legs SL1, SL2 appear to be parallel to the bottom portion of the foot rest FR. In other words, the one or more retractable foot rest support legs achieve a parallel position with relation to the bottom portion of the flat surface, in response to gravity. Alternatively, the foot rest support legs SL1, SL2 can be mechanically lowered or raised instead of relying on gravity. That is, with application of a force (such as pushing or pulling), the rest support legs SL1, SL2 can be lowered or raised.

Figure 3:
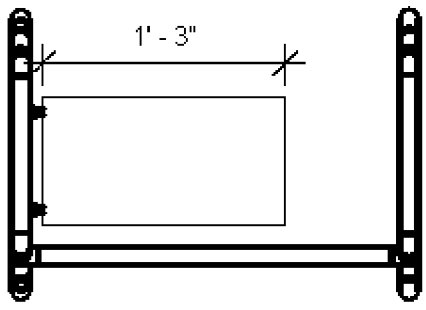
FIG. 3 is a top view of the walker step with the step in its lowered configuration.
Figure 4:
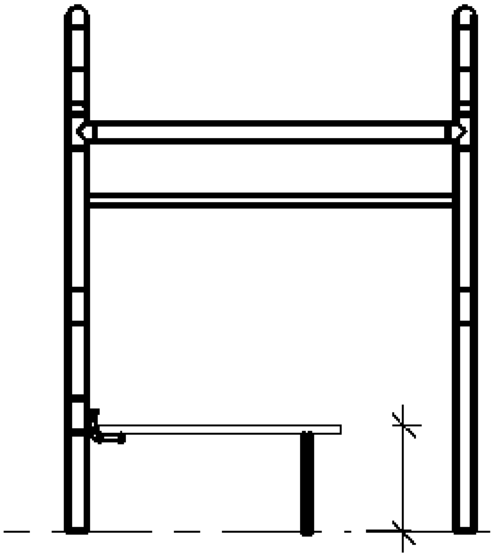
FIG. 4 is a front view of the walker step with the step in its lowered configuration.
Figure 5:
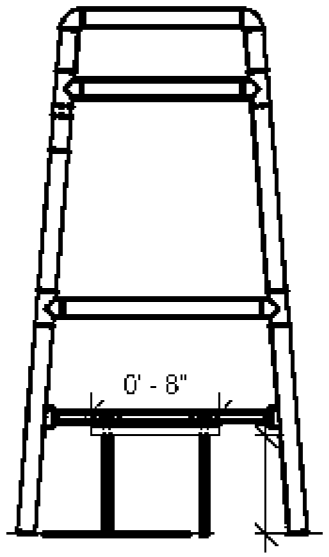
FIG. 5 is a side view of the walker step with the step in its lowered configuration.
Figure 6:
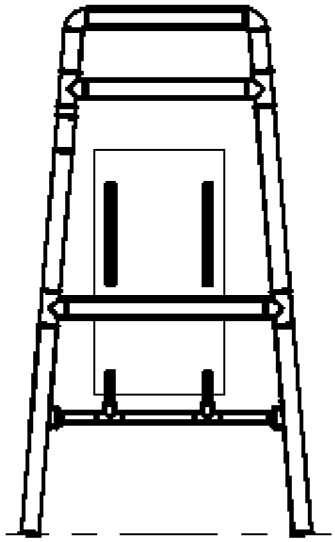
FIG. 6 is a side view of the walker step with the step in its raised configuration.
Figure 7:
FIG. 7 is a top view of the walker with the step in its raised configuration.
Figure 8:
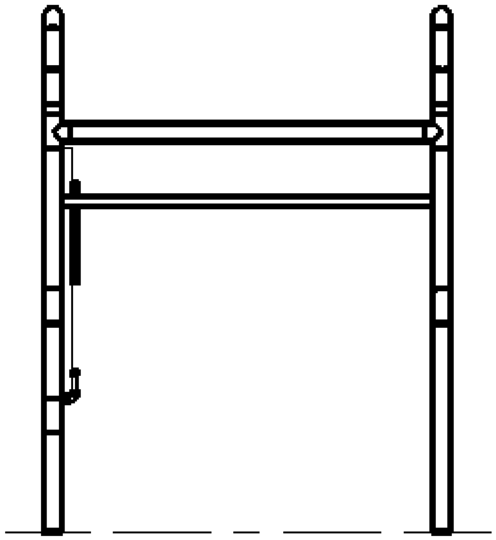
FIG. 8 is a front view of the walker step with the step in its raised configuration.

As shown in FIGS. 3, 4 and 5, certain elements of the of the foot rest FR have certain preferred measurements. For example, the length of the foot rest FR is preferably 1 feet and 3 inches, but other lengths are also possible. When the foot rest FR is in the lowered configuration, the difference in height between the foot rest FR and the floor is preferably $6\frac{3}{32}$ inches. On the other hand, the difference in height between the floor and the rod R is preferably $6\frac{21}{32}$ inches. Such difference in height facilitates reaching hard to reach places.

FIGS. 9-12B relate to a second embodiment of the subject disclosure. In this second embodiment, the walker B comprises a first frame 1', a second frame 2', wherein the first frame includes a first leg 12*a*' and a second leg 12*b*'; and the second frame 2' includes a first leg 13*a*' and a second leg 13*b*'. Moreover, the walker B comprises at least one horizontal support bar SB1' connecting the first leg 12*a*' of the first frame 1' to the first leg 13*a*' of the second frame 2'. It should be noted that the first end of the horizontal support bar SB1' can be welded or fastened to the first leg 12*a*' of the first frame and that the second end of the horizontal support bar SB1' can also welded or fastened to the first leg 13*a*' of the second frame. The first leg 12*a*' and second leg 12*b*' of the first frame along with the first leg 13*a*' and second leg 13*b*' of the second frame may include one or more rubber tips or rubber ferrules RT1-RT4 adapted to prevent the walker B from slipping and to cushion the walker from hard impacts with the ground.

The horizontal support bar SB1', in turn, includes a first connector C1 and a second connector C2, wherein the first connector C1 is adapted to hold in place a first vertical support bar VB1 and the second connector C2 is adapted to hold in place a second vertical support bar VB2. The connectors C1, C2*s* can be any fastening mechanism configured to hold or secure objects tightly together to prevent movement or separation through the application of inward pressure, such as a clamp. The vertical support bars VB1, VB2, in turn, are hollow tubes or bars having a top end and a bottom end. The top end of each vertical support bar VB1, VB2, includes an opening configured to receive the respective ends or legs of a handle H. In other words, the top end of the first vertical support bar is configured to receive the first end E1 of the handle H and the top end of the second vertical support bar is configured to receive the second end E2 of the handle H. The bottom end of the vertical support bars VB1, VB2, on the other hand, are pivotally connected to a foldable or stowable foot rest or step FR2 via one or more pivot joints PV1', PV2'.

Figure 9:
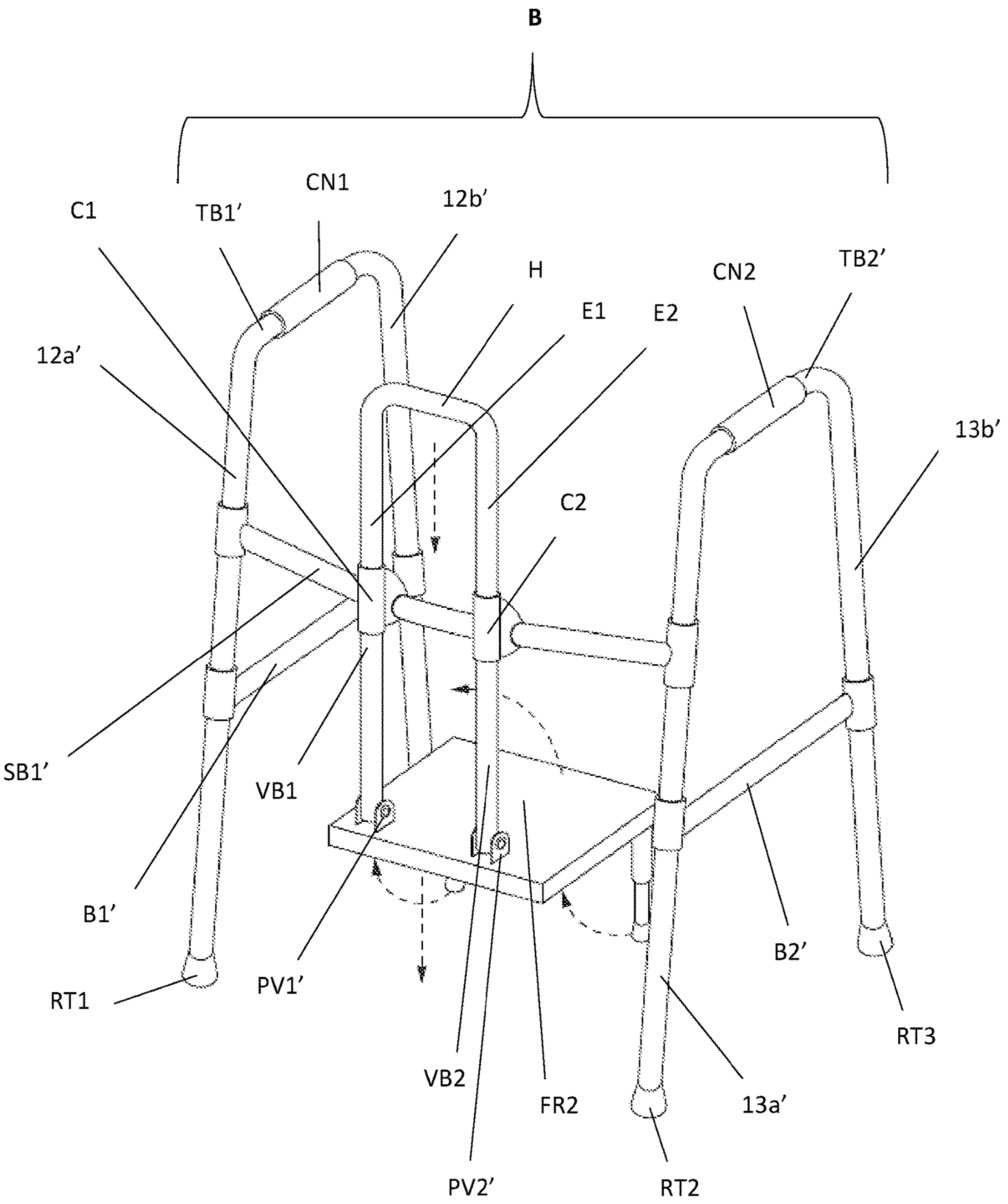
FIG. 9 is a front perspective view of a second embodiment of the walker step with the step in its lowered configuration.
Figure 10:
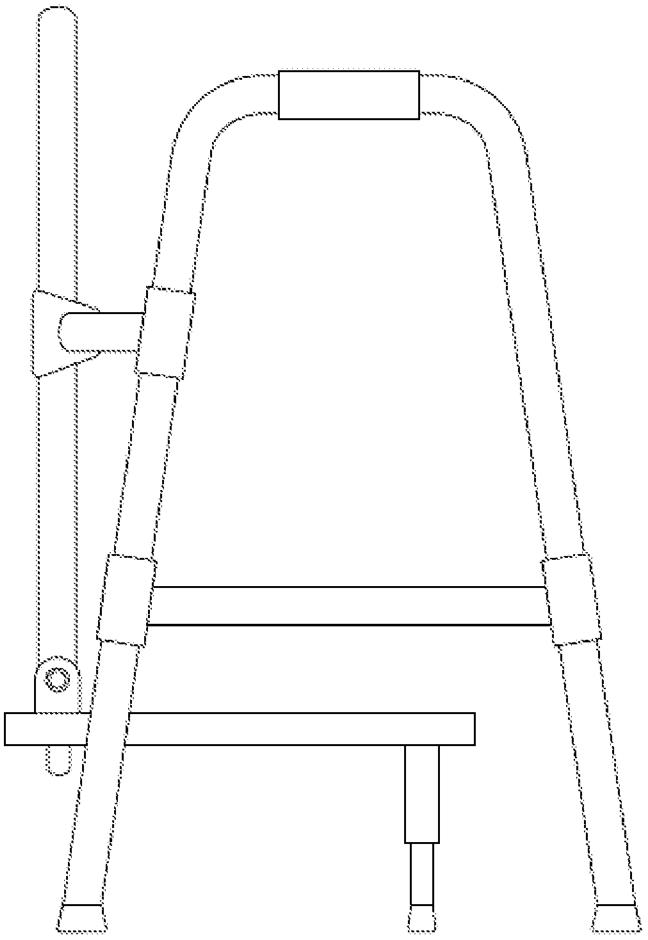
FIG. 10 is a side view of the second embodiment of the walker step with the step in its lowered configuration.
Figure 11:
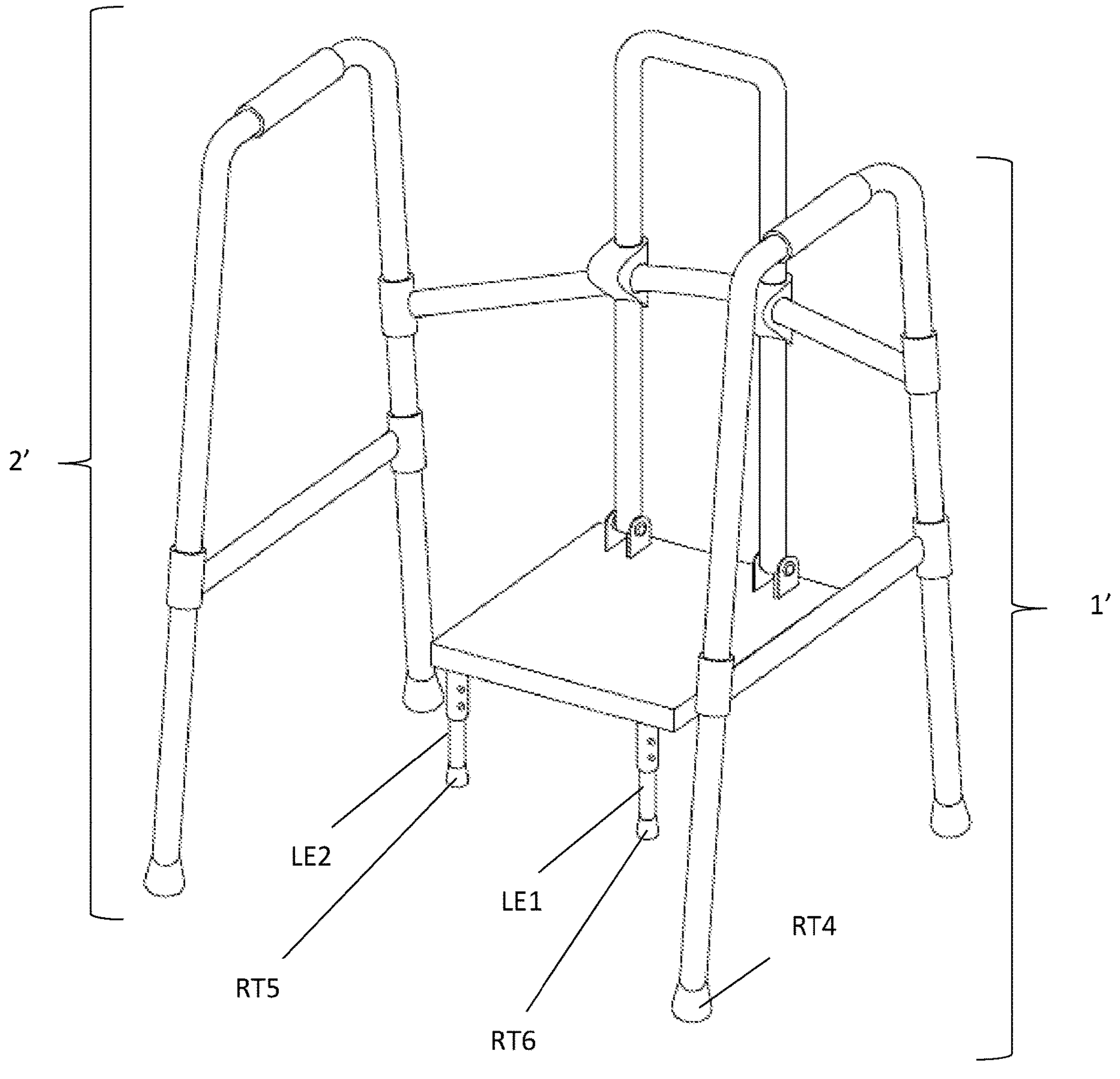
FIG. 11 is rear perspective view of the second embodiment of the walker step with the step in its lowered configuration.

The first frame 1' may optionally include one or more bars B1' connecting each first frame leg 12*a*', 12*b*'; and the second frame 2 may optionally include one or more bars B2', connecting each second frame leg 13*a*', 13*b*', in order to provide more stability to the first and second frames 1', 2'. Moreover, as shown in FIGS. 9-12B, the first frame 1' includes a first top bar TB1' connecting an upper end or portion of the first leg 12*a*' of first frame with an upper end or portion of the second leg 12*b*' of the first frame. Similarly, the second frame 2' includes a second top bar TB2' connecting an upper end or portion of the first leg 13*a*' of the second frame with an upper end or portion of the second leg 13*b*' of the second frame. The first and second top bars TB1', TB2' allow a user to grab or hold on to the walker B while using the walker B and may include one or more cushions CN1, CN2 configured to provide comfort or better grip to a user while grabbing or holding onto the top bars TB1', TB2'. It should be noted that the first leg 12*a*' and second leg 12*b*' of the first frame 1'; as well as the first leg 13*a*' and second leg 13*b*' of the second frame 2', may extend obliquely and away from the center of the corresponding top bar. This configuration provides additional stability to the walker B, as shown in FIGS. 9-11.

Figure 12A:
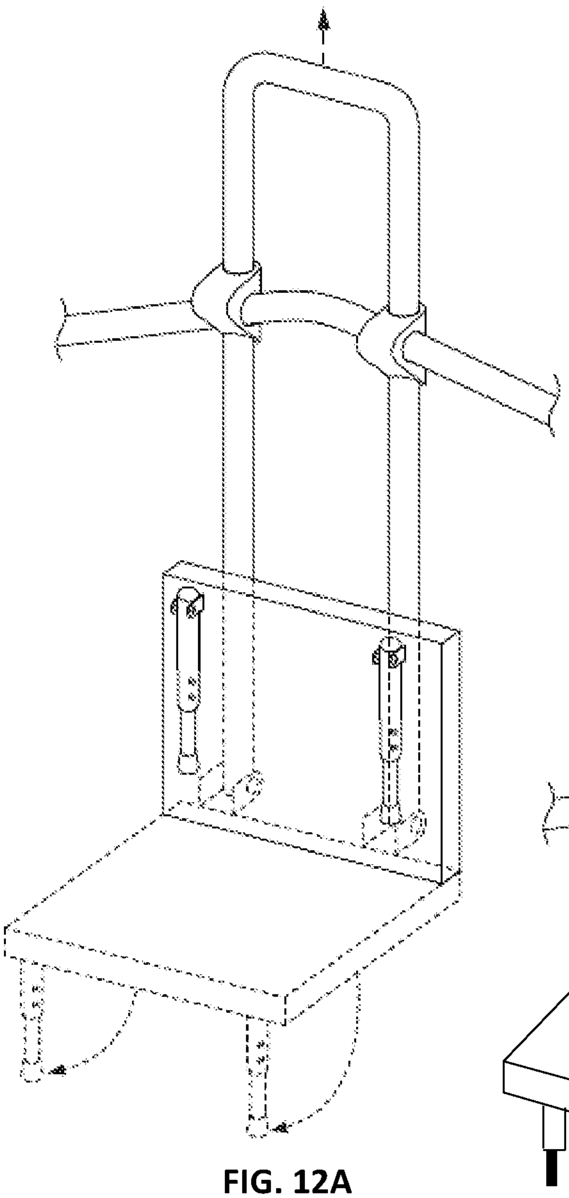
FIGS. 12A-B show operation of the walker step of the second embodiment.
Figure 12B:
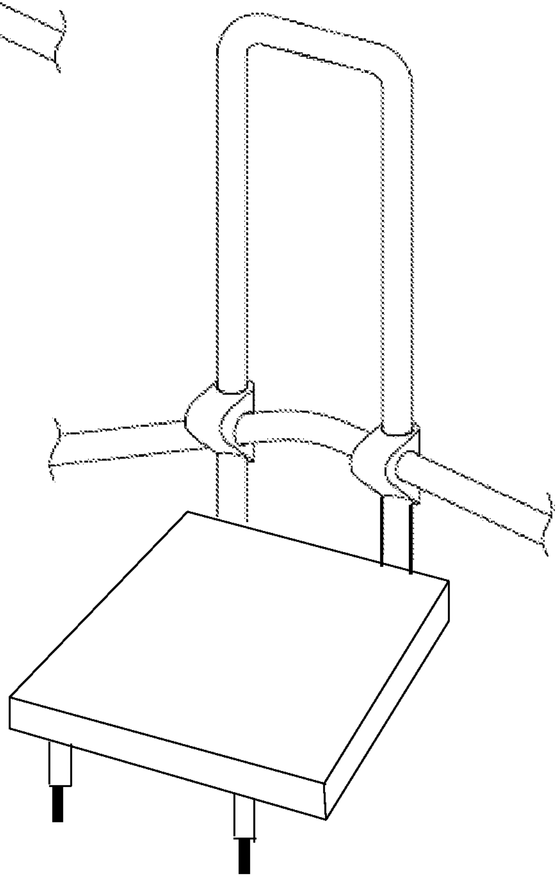

It should be noted that in this second embodiment the folding action of the foot rest or step FR2 is actuated via the handle H. When the handle H is pulled upwards, the handle H engages the pivoting foot rest or step FR2 to deploy one or more leg extensions LE1, LE2 from the bottom of the foot rest or step FR2 until the foot rest FR2 comes to a horizontal position. As shown in FIG. 11, the one or more leg extensions LE1, LE2 are adjustable or telescopic; and therefore, can retract or protract to the desired height. The one or more leg extensions LE1, LE2 may also include rubber tips or rubber ferrules RT5, RT6 to prevent the foot rest FR2 from slipping and/or to provide cushion to the foot rest when impacting the ground. The one or more leg extensions LE1, LE2 may also include a soft-close hinge, which is a type of hinge that features a hydraulic mechanism built into it. As the foot rest is lowered, the hydraulics take charge and ease the lowering of the leg extensions LE1, LE2 in somewhat of a gliding motion until reaching a position that is perpendicularly to the bottom of the foot rest FR2. It should be noted that when the foot rest FR2 is in the horizontal position, as shown in FIGS. 10 and 12B, the handle H is higher than the top bars TB1', TB2', thereby providing support to a user while using the foot rest FR2. Conversely, when the handle H is pressed downwards, the pivoting action of the foot rest or step FR2 will retract the one or more leg extensions LE1, LE2 and bring the foot rest or step FR2 back to the vertical position. When the foot rest FR2 is in the vertical position, as shown in FIG. 12A, the handle H is lower or leveled with the top bars TB1', TB2', thereby providing uniformity to the appearance of the walker B.

Figure 13:
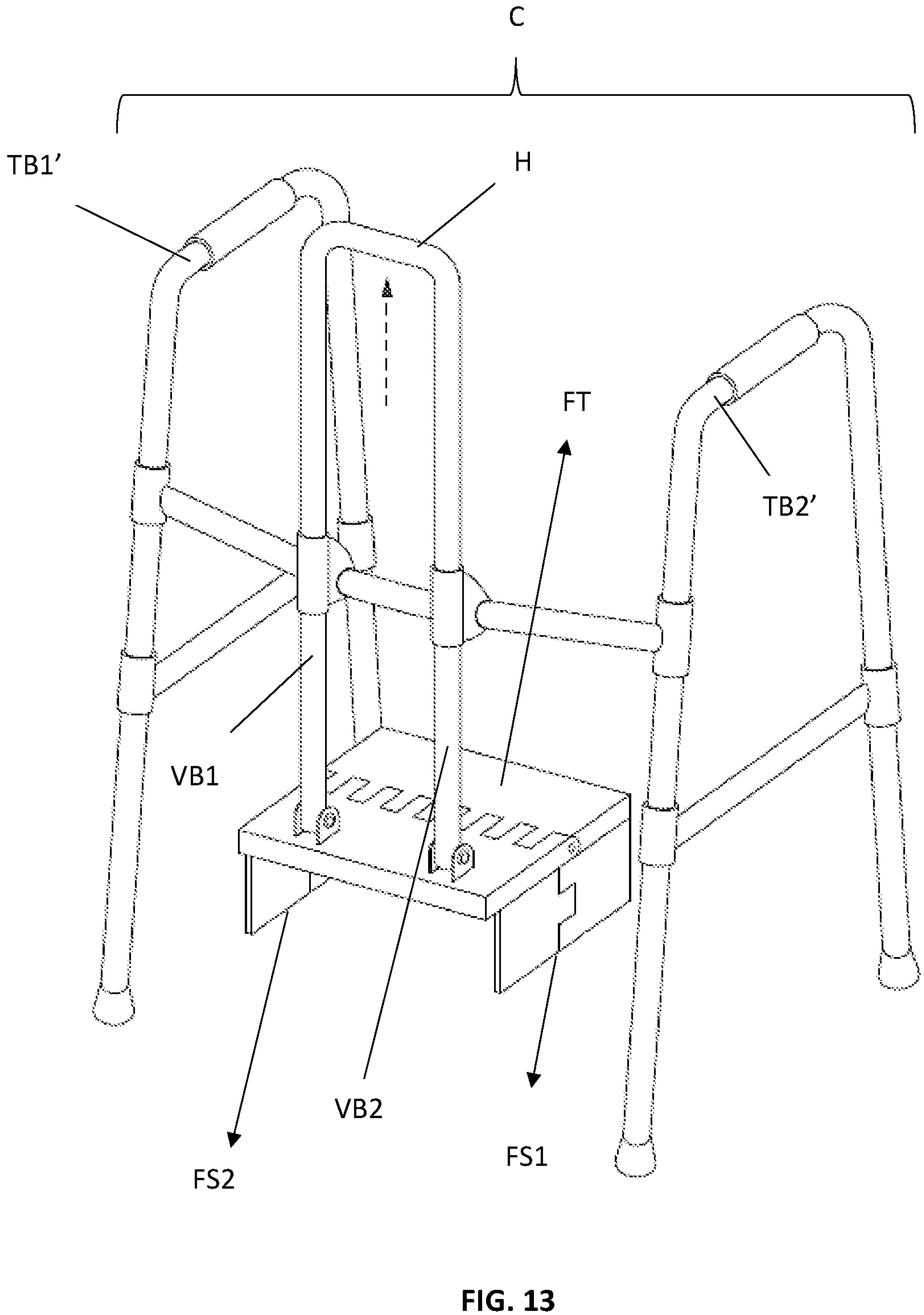
FIG. 13 is a front perspective view of a third embodiment of the walker step with a folding step in its lowered configuration.
Figure 14:
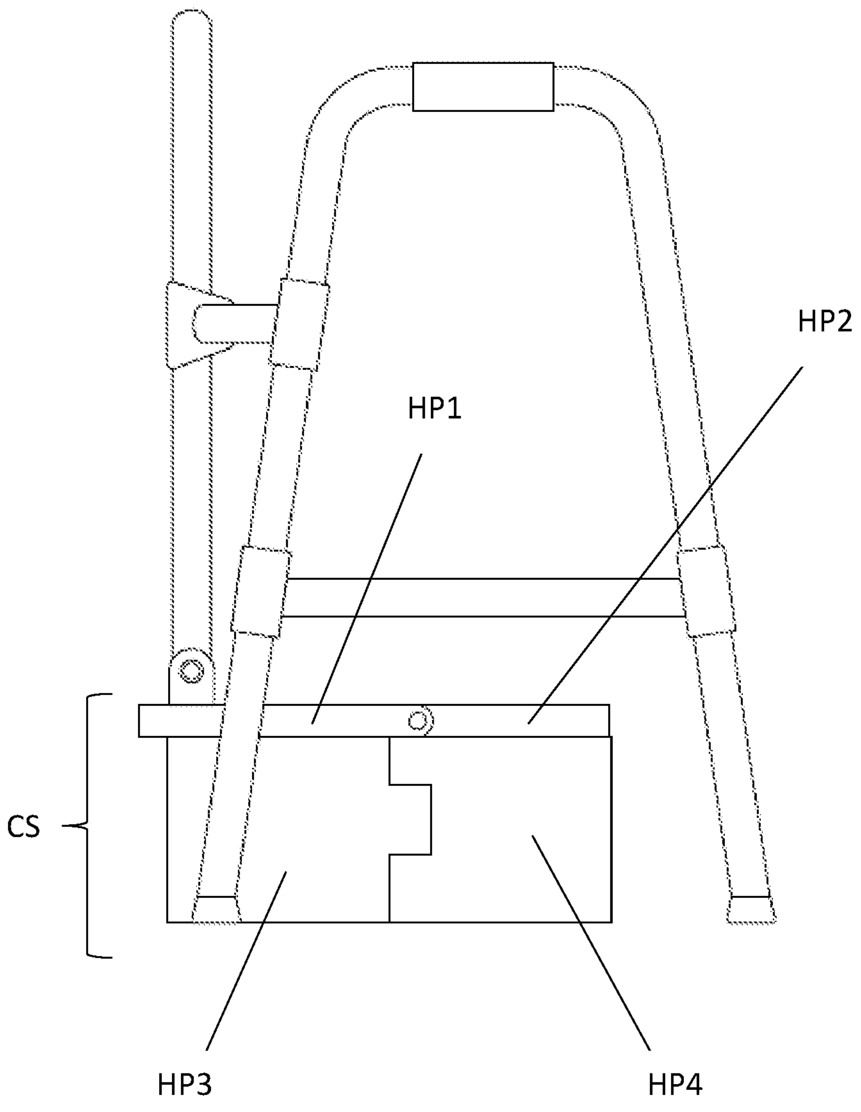
FIG. 14 is a side view of the third embodiment of the walker step with the folding step in its lowered configuration.
Figure 15:
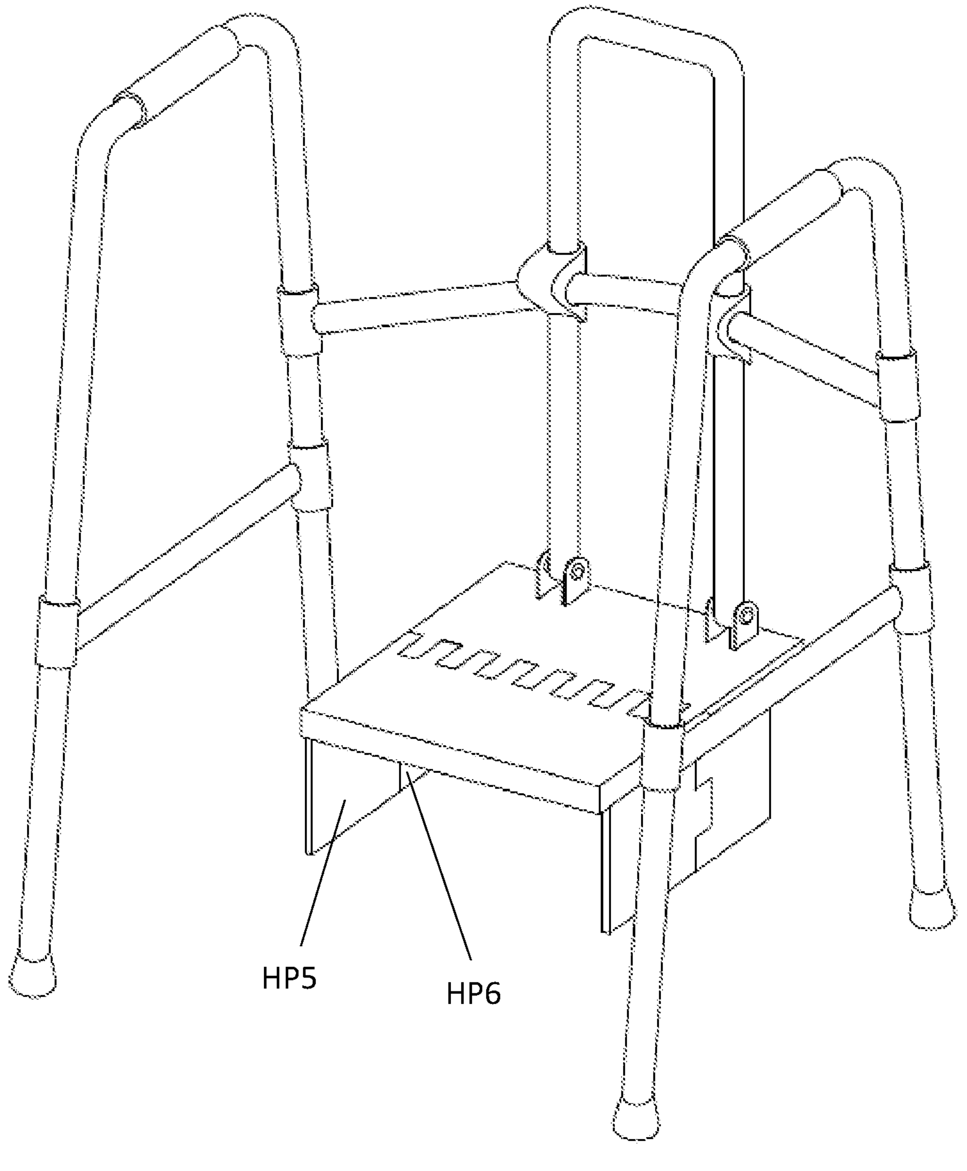
FIG. 15 is rear perspective view of the third embodiment of the walker step with the folding step in its lowered configuration.
Figure 16A:
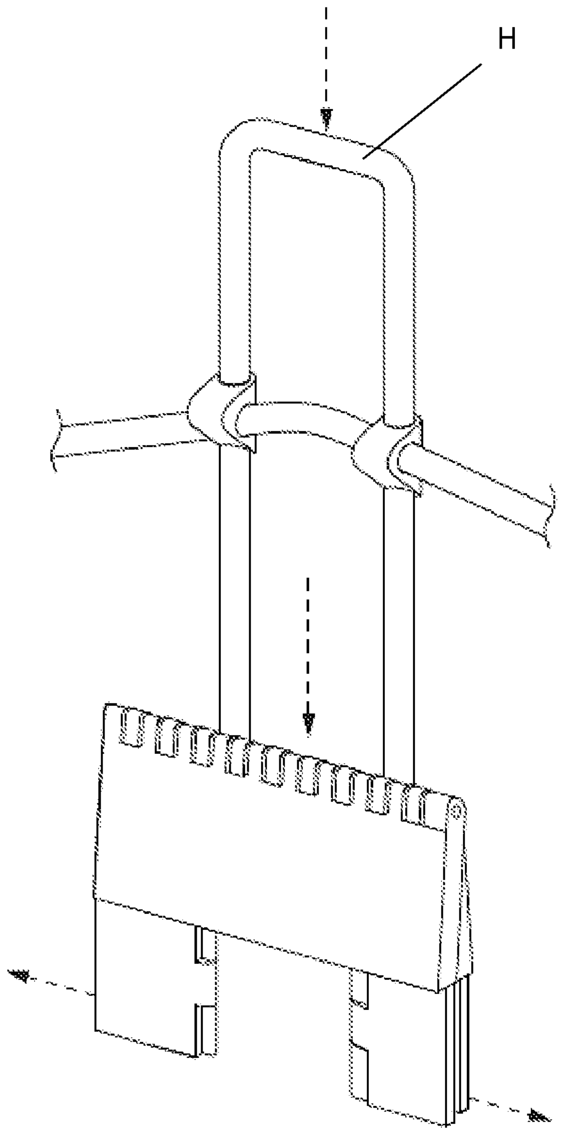
FIG. 16A-B show operation of the walker step of the third embodiment.
Figure 16B:
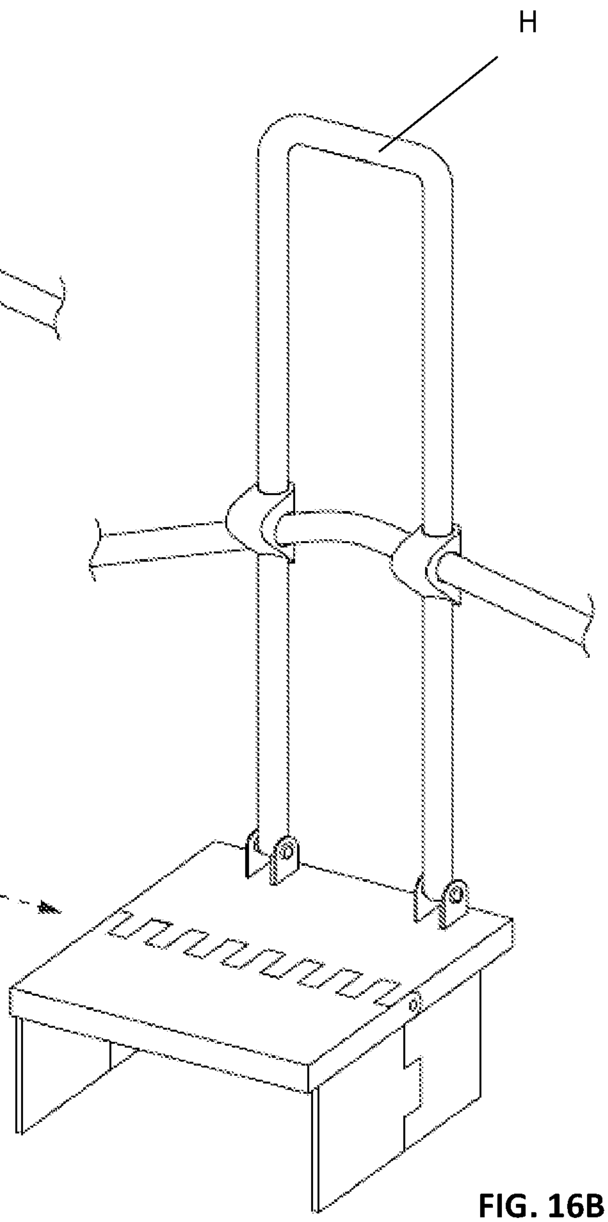

FIGS. 13-16B, in turn, refer to a third embodiment of the subject disclosure. In this embodiment, the walker C is structurally similar to the second embodiment B with one main difference. The difference being that the walker C includes a collapsible step CS, instead of the foot rest FR2. As in the foot rest FR2 of the walker B, the collapsible step CS of walker C is pivotally connected to the bottom end of the vertical support bars VB1, VB2. Moreover, the collapsible step CS comprises a foldable top FT having first and second hingeable portions HP1, HP2; a foldable first side FS1 having first and second hingeable portions HP3, HP4; and a foldable second side FS2 having first and second hingeable portions HP5, HP6, as shown in FIGS. 13 and 16A-B. The hingeable portions may compromise a hinge mechanism or similar structure configured to provide and angle of rotation between each corresponding portion HP1-HP6.

The collapsible step CS is actuated via the handle similarly to foot rest or step FR2. When the handle H is pulled upwards, the handle H engages the first and second hingeable portions HP1, HP2 of the foldable top FT, which, in turn, causes the first and second hingeable portions HP3, HP4 on the first side FS1 and the first and second hingeable portions HP5, HP6 on the second side FS2 to protract, thereby allowing the collapsible step CS to come to a horizontal position. When the collapsible step CS is in the horizontal position, as shown in FIGS. 13 and 16B, the handle H is higher than the top bars TB1', TB2', thereby providing support to a user while using the collapsible step CS. Conversely, when the handle H is pressed downwards, the pivoting action of the collapsible step CS causes the first and second hingeable portions HP1, HP2 on the foldable top FT to close or fold, which in turn, causes the first and second hingeable portions HP3, HP4 on the first side FS1 and the first and second hingeable portions HP5, HP6 on the second side FS2 to retract, thereby allowing the collapsible step CS to achieve a vertical position. When the collapsible step CS is in the vertical position, as shown in FIG. 16A, the handle H is lower or leveled with the top bars TB1', TB2', thereby providing uniformity to the appearance of the walker C.

Although certain exemplary embodiments and methods have been described in some detail, for clarity of understanding and by way of example, it will be apparent from the foregoing disclosure to those skilled in the art that variations, modifications, changes, and adaptations of such embodiments and methods may be made without departing from the true spirit and scope of the claims. Therefore, the above description should not be taken as limiting the scope of the invention which is defined by the appended claims.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means plus function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

What is claimed is:

1. A walker with a foldable foot rest, comprising:

a first frame;

a second frame;

a handle having a first end and a second end;

wherein the first frame includes a first leg and a second leg;

wherein the second frame includes a first leg and a second leg;

horizontal support bar connecting the first leg of the first frame to the first leg of the second frame; wherein the at least one horizontal support bar, in turn, includes a first connector and a second connector;

wherein the first connector is adapted to hold in place a first vertical support bar having a top end and a bottom end, and the second connector is adapted to hold in place a second vertical support bar having a top end and a bottom end;

wherein the top end of the first vertical support bar is configured to receive the first end of the handle, and the top end of the second vertical support bar is configured to receive the second end of the handle;

wherein the bottom end of each vertical support bar is pivotally connected, via one or more pivot joints, to a foldable foot rest;

a first top bar connecting an upper end of the first leg of the first frame with an upper end of the second leg of the first frame;

a second top bar connecting an upper end of the second leg of the second frame with an upper end of the second leg of the second frame; and wherein the folding action of the foot rest is actuated via the handle.

2. The walker of claim 1, wherein at least one of the first leg and second leg of the first frame includes a rubber ferrule adapted to prevent the walker from slipping.

3. The walker of claim 1, wherein at least one of the first leg and second leg of the second frame includes a rubber ferrule adapted to prevent the walker from slipping.

4. The walker of claim 1, wherein when the handle is pulled upwards, the handle engages the foot rest to deploy one or more leg extensions from a bottom surface of the foot rest until the foot rest comes to a horizontal position.

5. The walker of claim 4, wherein when the handle is pressed downwards, the pivoting action of the foot rest retracts the one or more leg extensions and bring the foot rest to a vertical position.

6. The walker of claim 4, wherein the one or more leg extensions are adjustable or telescopic.

7. The walker of claim 4, wherein the one or more leg extensions include rubber ferrules to prevent the foot rest from slipping or to provide cushion to the foot rest when impacting the ground.

8. The walker of claim 1, wherein the first frame includes one or more bars connecting each leg from the first frame.

9. The walker of claim 1, wherein the second frame includes one or more bars connecting each leg from the second frame.

10. The walker of claim 1, wherein each of the first and second top bars include a cushion configured to provide comfort or better grip to a user.

11. A walker with a collapsible step, comprising:

a first frame;

a second frame;

a handle having a first end and a second end;

wherein the first frame includes a first leg and a second leg;

wherein the second frame includes a first leg and a second leg;

one or more horizontal support bars connecting the first leg of the first frame to the first leg of the second frame;

wherein the horizontal support bar, in turn, includes a first connector and a second connector;

wherein the first connector is adapted to hold in place a first vertical support bar having a top end and a bottom end, and the second connector is adapted to hold in place a second vertical support bar having a top end and a bottom end;

wherein the top end of the first vertical support bar is configured to receive the first end of the handle, and the top end of the second vertical support bar is configured to receive the second end of the handle;

wherein the bottom end of each vertical support bar is pivotally connected, via one or more pivot joints, to a collapsible step, wherein the collapsible step comprises a foldable top having first and second hingeable portions, a foldable first side having first and second hingeable portions, and a foldable second side having first and second hingeable portions;

a first top bar connecting an upper end of the first leg of the first frame with an upper end of the second leg of the first frame;

a second top bar connecting an upper end of the second leg of the second frame with an upper end of the second leg of the second frame; and wherein the folding action of the collapsible step is actuated via the handle.

12. The walker of claim 11, wherein when the handle is pulled upwards, the handle engages the first and second hingeable portions of the foldable top, which, in turn, causes the first and second hingeable portions on the first side and the first and second hingeable portions on the second side to protract, thereby allowing the collapsible step to come to a horizontal position.

13. The walker of claim 12, wherein when the handle is pressed downwards, the pivoting action of the collapsible step causes the first and second hingeable portions on the foldable top to close or fold, which in turn, causes the first and second hingeable portions on the first side and the first and second hingeable portions on the second side to retract, thereby allowing the collapsible step to achieve a vertical position.

14. The walker of claim 11, wherein at least one of the first leg and second leg of the first frame includes a rubber ferrule adapted to prevent the walker from slipping.

15. The walker of claim 11, wherein at least one of the first leg and second leg of the second frame includes a rubber ferrule adapted to prevent the walker from slipping.

16. The walker of claim 11, wherein the first frame includes one or more bars connecting each leg from the first frame.

17. The walker of claim 11, wherein the second frame includes one or more bars connecting each leg from the second frame.

18. The walker of claim 11, wherein each of the first and second top bars include a cushion configured to provide comfort or better grip to a user.

* * * * *